Patented Dec. 22, 1931

1,838,058

UNITED STATES PATENT OFFICE

WERNER M. LAUTER, OF AKRON, OHIO, ASSIGNOR TO THE GOODYEAR TIRE & RUBBER COMPANY, OF AKRON, OHIO, A CORPORATION OF OHIO

ANTIOXIDANT

No Drawing.   Application filed January 13, 1930.  Serial No. 420,637.

This invention relates to improvements in rubber compounds, and it has particular relation to the manufacture of rubber compounds which are employed in articles that are exposed to the action of light and relatively high temperatures.

The object of the invention is to provide a simple, economical and convenient antioxidant for retarding the action of oxygen and light, which ordinarily cause premature decay, loss of tensile strength, and loss of elasticity in rubber goods, under the action of heat, light and air.

Heretofore, it has been observed that certain organic compounds, e. g. hydroquinone and reaction products of certain aldehydes with naphthylamines, act as antioxidants or preservatives against attacks by oxygen, heat and light in the compounds into which they are introduced. Although many compounds have been tested which exhibit some beneficial results when incorporated into the rubber, most of them are undesirable from a commercial viewpoint for various reasons. For example, some of them are comparatively insoluble in rubber and for that reason they cannot be distributed uniformly therethrough. Others are too expensive for use in ordinary articles.

This invention consists in the discovery that the reaction products of amino acenaphthene and the ordinary aldehydes, as well as certain of the organic acids, when incorporated into rubber articles, exhibit excellent antioxidant properties. These reaction products may conveniently be prepared by dissolving the amino acenaphthene in alcohol, petroleum ether, or substantially any other convenient solvent, and then adding the aldehyde thereto. If reaction does not take place with sufficient rapidity upon the addition of the aldehyde, it may be accelerated by subjecting the mixture to heat under a reflux condenser for a suitable period of time.

In general, the reaction products so formed are complex mixtures which cannot readily be separated into pure materials. However, that is not of any particular detriment, because the mixtures as a whole may conveniently be employed in rubber compounds without subjecting them to purification. The reaction product of amino acenaphthene and formaldehyde is obtained as a white solid melting at 235° to 240° C. which may conveniently be ground upon a mill or other suitable instrumentality to reduce it to a powdery form which readily mills into rubber. Most of the other aldehydes react with amino acenaphthene to produce compounds which are more or less of a soft pasty nature. These pastes, of course, may readily be milled into rubber while they are in that state. Accordingly, the step of reducing the compounds to powder is obviated when they are employed.

Although reaction products of amino acenaphthene and the various aldehydes may be employed as antioxidants in most of the standard rubber compounds, the following is an example of such compound in which they have been found to be particularly efficient:

|  | Parts |
|---|---|
| Pale crepe rubber | 100 |
| Zinc oxide | 5 |
| Sulfur | 3 |
| Hexamethylene tetramine | 1 |
| Stearic acid | 1.5 |
| Antioxidant | 1 |

Of course, it is to be understood that the above formula is merely exemplary and that the portions of the various ingredients designated therein may be changed at will to change the characteristics of the products to a certain degree, as may be desired for various purposes. It is also possible to substitute equivalents for some of the constituents in the compound, for example, the hexamethylene tetramine employed as an accelerator may be replacel by diphenylguanidine, mercaptobenzothiazole, or any other convenient reagent of like properties.

In order to test the power of the amino acenaphthene derivatives of the various aldehydes as oxidation retarders, samples of rubber prepared in accordance with the preceding formula were subjected to vulcanization for varying periods of time, after which the samples were divided into two sets. One of these was subjected immediately to physical tests in order to ascertain the tensile strength and elasticity of the various members prior to aging. The second set of samples, consisting of members identical with those contained in the first set, was weighed in order to ascertain the mass thereof prior to absorption of any oxygen. The samples were then placed in an oxygen bomb and exposed to the action of that gas for a period of six days under a pressure of 150 lbs. per square inch, and at a temperature of 50° C. At the conclusion of this period of artificial aging, the samples were removed and weighed to ascertain the per cent of oxygen taken up. They were next subjected to physical tests identical to those conducted in connection with the first set of samples. The results of these various tests are tabulated as follows:

| Cure in mins. | Temp. in °C. | Stress in kgs./cm.² at— | | | Per cent elong. at break | Per cent weight increase |
|---|---|---|---|---|---|---|
| | | 500% elong. | 700% elong. | Break | | |

*Anhydro-formaldehyde-amino-acenaphthene, M. P. 235°–240° C.*

ORIGINAL

| 35 | 285 | 14 | 40 | 100 | 870 | -------- |
| 50 | 285 | 19 | 60 | 132 | 840 | -------- |
| 70 | 285 | 37 | 138 | 143 | 705 | -------- |

AGE TEST

| 35 | 285 | 17 | 62 | 110 | 800 | .08 |
| 50 | 285 | 23 | 89 | 138 | 775 | .13 |
| 70 | 285 | 37 | -------- | 125 | 675 | .16 |

*3-formyl-amino-acenaphthene M. P. 171° C.*

ORIGINAL

| 35 | 285 | 12 | 38 | 102 | 875 | -------- |
| 50 | 285 | 19 | 58 | 108 | 810 | -------- |
| 70 | 285 | 20 | 70 | 142 | 820 | -------- |

AGE TEST

| 35 | 285 | 16 | 49 | 110 | 855 | .06 |
| 50 | 285 | 23 | 75 | 132 | 800 | .06 |
| 70 | 285 | 28 | 97 | 134 | 755 | .07 |

| Cure in mins. | Temp. in °C. | Stress in kgs./cm.² at— | | | Per cent elong. at break | Per cent weight increase |
|---|---|---|---|---|---|---|
| | | 500% elong. | 700% elong. | Break | | |

*Crotonic-aldehyde-amino-acenaphthene*

ORIGINAL

| 35 | 285 | 23 | 82 | 138 | 790 | -------- |
| 50 | 285 | 32 | 122 | 172 | 760 | -------- |
| 70 | 285 | 44 | 163 | 168 | 705 | -------- |

AGE TEST

| 35 | 285 | 28 | 106 | 140 | 750 | .05 |
| 50 | 285 | 36 | -------- | 134 | 695 | .16 |
| 70 | 285 | 46 | -------- | 158 | 680 | .26 |

*Butyr-aldehyde-amino-acenaphthene*

ORIGINAL

| 35 | 285 | 15 | 39 | 92 | 865 | -------- |
| 50 | 285 | 20 | 63 | 126 | 825 | -------- |
| 70 | 285 | 30 | 95 | 144 | 770 | -------- |

AGE TEST

| 35 | 285 | 19 | 62 | 104 | 790 | .04 |
| 50 | 285 | 23 | 80 | 136 | 795 | .07 |
| 70 | 285 | 37 | -------- | 132 | 695 | .08 |

It will be observed that samples containing the antioxidants absorb only very small percentages of oxygen, even under the extremely severe conditions existing in the oxygen bomb. Furthermore, the samples retain their original tensile strength and elasticity to a very remarkable degree. Under similar conditions samples containing no antioxidant would have been reduced to resinous masses substantially devoid of elasticity and tensile strength.

In addition to being useful rubber preservatives, the new antioxidants may also be employed with excellent results in transformer oils, in soaps, and in various other compounds of similar nature which are subject to deterioration by the action of oxygen and light. It is to be understood that the invention is not limited to the use of the specific aldehydes enumerated above, but includes various other aldehydes, such as acetaldehyde, benzaldehyde, heptaldehyde, allyl aldehyde, amyl aldehyde, furfuraldehyde and aldol, all of which may be caused to react with amino acenaphthene in the manner described in connection with the aldehydes enumerated above to produce antioxidants of satisfactory characteristics.

Although I have described in detail only the preferred forms which the invention may assume, it will be apparent to those skilled in the art that the invention is not so limited but that various modifications may be made

What I claim is:

1. A method of preserving rubber compounds which comprises incorporating therein a reaction product of amino acenaphthene and an aldehyde.

2. A method of preserving rubber compounds which comprises incorporating therein a reaction product of amino acenaphthene and an aliphatic aldehyde.

3. A method of preserving rubber which comprises subjecting it to vulcanization in the presence of a reaction product of amino acenaphthene and formic acid.

4. A method of preserving rubber which comprises subjecting it to vulcanization in the presence of a derivative of amino acenaphthene and an aldehyde selected from the group consisting of anhydro formaldehyde, croton aldehyde, butyr aldehyde, heptaldehyde, benzaldehyde and acetaldol.

5. A method of preserving rubber which comprises subjecting it to vulcanization in the presence of a reaction product of amino acenaphthene and a material selected from a group consisting of aliphatic aldehydes and formic acid.

6. A method of preserving oxidizable organic compounds which comprises introducing therein a derivative of amino acenaphthene and an aldehyde.

7. A method of preserving oxidizable organic compounds which comprises introducing therein a derivative of amino acenaphthene and a material selected from the following group: anhydro formaldehyde, croton aldehyde, butyr aldehyde, heptaldehyde, benzaldehyde, and acetaldehyde.

8. A rubber product that has been vulcanized in the presence of a material prepared by the interaction of amino acenaphthene and an aldehyde.

9. A rubber product that has been vulcanized in the presence of a material prepared by the interaction of amino acenaphthene and an aliphatic aldehyde.

10. A derivative of amino acenaphthene and a material selected from the following group: formaldehyde, croton aldehyde, butyr aldehyde, benzaldehyde, heptaldehyde, acetaldehyde, aldol and formic acid.

11. As a new chemical compound, the reaction product of amino acenaphthene and an aldehyde.

12. As a new chemical compound, the reaction product of amino acenaphthene and an aliphatic aldehyde.

13. As a new chemical compound, the reaction product of amino acenaphthene and a material selected from the group consisting of formaldehyde, acetaldehyde, croton aldehyde, butyr aldehyde, heptaldehyde, amyl aldehyde, benzaldehyde, aldol and formic acid.

In witness whereof, I have hereunto signed my name.

Signed at Akron, in the county of Summit and State of Ohio, U. S. A., this 11th day of January, 1930.

WERNER M. LAUTER.